J. HOWARTH,
Assignor, by mesne assignments, to THE CARBON BLACK CO.
Manufacture of Carbon Black.
No. 9,696. Reissued May 10, 1881.
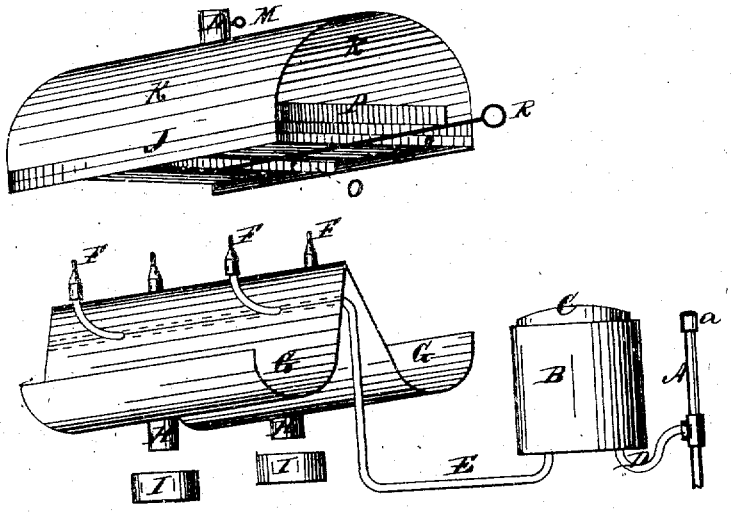
WITNESSES:
T. W. Smith Jr.
John F. C. Brunkert
John Howarth INVENTOR:
BY
Wm. C. W. Intire ATTORNEY.

UNITED STATES PATENT OFFICE.

JOHN HOWARTH, OF NEW CUMBERLAND, W. VA., ASSIGNOR, BY MESNE ASSIGNMENTS, TO THE CARBON BLACK COMPANY, OF NEW YORK, N. Y.

MANUFACTURE OF CARBON-BLACK.

SPECIFICATION forming part of Reissued Letters Patent No. 9,696, dated May 10, 1881.

Original No. 131,446, dated September 17, 1872; Reissue No. 6,937, dated February 22, 1876. Application for reissue filed September 9, 1880.

DIVISION A.

*To all whom it may concern:*

Be it known that I, JOHN HOWARTH, of New Cumberland, in the county of Hancock and State of West Virginia, have made an invention of a new and useful Carbon-Black; and I do hereby declare the following to be a full, clear, and exact description thereof, reference being had to the accompanying drawing, which is a perspective view of the apparatus used for carrying out my invention.

The purpose of my invention is to utilize the carbureted hydrogen gas which escapes in considerable quantities from the tubular wells sunk in the earth in the attempt to obtain petroleum or hydrocarbon oil, this gas having heretofore been allowed, usually, to go to waste, the result of this utilization being a superior carbon-black, readily distinguishable from any other carbon-black now known.

To enable others to carry out my invention and produce this improved product, I will proceed to describe the process by which it is obtained, referring by letters to the accompanying drawing, which is a perspective view of an apparatus which I have found to be very practical.

A represents the upper portion of the tube of a tubular well, such as is sunk in many localities in prospecting for petroleum-oil, such tube being provided with a safety-valve, *a*, which permits of the escape of gas when the pressure exerted by it upon the receiver is too great.

B represents a vessel, composed of a suitable material, and containing a quantity of water or oil, upon which a bell-float, C, is placed, after the manner of ordinary gas-reservoirs, the well-tube A communicating with the interior of the vessel B by a suitable pipe, D.

Extending from the receiver B to a suitable locality is a second pipe, E, which terminates in a horizontal extension, upon which are placed a series of gas-burners, F F, &c., in such number as may be found desirable. Below each burner or set of burners I dispose a curved apron or trough, G, from the bottom of which one or more discharge pipes or ports, H H, extend, the outlet of each pipe being situated immediately over a movable box or receptacle, I, placed below them.

In order to intercept the flame issuing from each burner and collect the carbon resulting from the partial combustion thereof, I employ a slab or tile, J, of soapstone or other material, which I dispose horizontally over the series of burners, this slab being pierced with a number of orifices to permit the passage of an excess of smoke. As a high temperature of the slab J would impair the color of the carbon-black deposited upon it, I construct upon its upper side a closed pan or vessel, P, of water, to reduce its temperature, such water being constantly renewed, the tile being covered with a suitable dome or roof, K, disposed as shown in the drawing, this dome or roof being provided with a ventilating-pipe, L, in which is placed a damper, M.

Below the slab or tile J, I dispose one or more transverse horizontal scrapers, O O, &c., these scrapers being supported and sliding in horizontal grooves or ways *a' a'*, formed in the lower part and on opposite sides of the dome K.

In practice I prefer that a scraper should be provided for each pair of burners, in order that a short movement of the handle or rod R, which connects them, may suffice to scrape the entire under surface of the slab J.

The operation of the apparatus is as follows: The gas, issuing from the tube A under considerable pressure, passes through the pipe D and into the reservoir B, from whence it passes into the pipe E and burners F F, &c. The gate of each burner is opened and the gas lighted, each flame being intercepted by the soapstone slab J, which is located immediately over them. The carbon resulting from the incomplete combustion of the gas is deposited upon the under side of the slab J, from which it is to be detached by scrapers O O, &c., and precipitated into the troughs G G, from whence it is delivered through the ports H H to the vessels I I, which are to be emptied into a suitable receiver as often as necessary. Any particles of carbon-black which may escape upwardly, through the perforations of the slab J will enter the chamber or dome K and be deposited upon the cover of the pan P or other parts of the chamber.

The safety-valve *a* provides a means of disposing of such portion of the gas issuing from the well-tube as is not required at the burners.

My carbon-black is more intense in its blackness than, and readily distinguishable from, any of the known carbon-blacks heretofore produced.

What I claim as new, and desire to secure by Letters Patent, is—

1. Carbon-black possessing the peculiarities of intense blackness and homogeneity, as specified, and forming a new article of manufacture.

2. The production of carbon-black from the natural carbureted hydrogen gas issuing from the earth, by the process as herein described, consisting in collecting and incompletely burning the gas and collecting the product.

JOHN HOWARTH.

Witnesses:
A. G. WILLIAMS,
ALEX. MITCHELL.